(12) United States Patent
Shenker et al.

(10) Patent No.: US 9,226,039 B2
(45) Date of Patent: Dec. 29, 2015

(54) MESSAGE DELIVERY HANDLING

(75) Inventors: Reuel Shenker, Beit Shemesh (IL); Kevin A. Murray, Fordingbridge Hampshire (GB)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 14/001,126

(22) PCT Filed: Nov. 29, 2011

(86) PCT No.: PCT/IB2011/055359
§ 371 (c)(1),
(2), (4) Date: Aug. 22, 2013

(87) PCT Pub. No.: WO2012/168769
PCT Pub. Date: Dec. 13, 2012

(65) Prior Publication Data
US 2013/0332976 A1    Dec. 12, 2013

(30) Foreign Application Priority Data
Jun. 9, 2011   (GB) .................................. 1109624.5

(51) Int. Cl.
*H04N 21/6332*    (2011.01)
*H04N 21/266*    (2011.01)
(Continued)

(52) U.S. Cl.
CPC ............ *H04N 21/6332* (2013.01); *H04L 12/12* (2013.01); *H04N 21/26606* (2013.01); *H04N 21/6334* (2013.01); *H04L 51/14* (2013.01); *H04N 21/41407* (2013.01); *H04N 21/4882* (2013.01); *Y02B 60/34* (2013.01)

(58) Field of Classification Search
USPC ......................................................... 725/114
See application file for complete search history.

(56) References Cited

U.S. PATENT DOCUMENTS 6,694,149 B1    2/2004  Ady et al.
2002/0120928 A1   8/2002  Wajs
(Continued)

FOREIGN PATENT DOCUMENTS

EP    1 711 013 A1    10/2006
JP    2008141350    6/2008
(Continued)

OTHER PUBLICATIONS

Apr. 3, 2012 Transmittal of International Search Report and Written Opinion of the International Searching Authority for captioned application.
(Continued)

*Primary Examiner* — Kieu Oanh T Bui
(74) *Attorney, Agent, or Firm* — Hahn Loeser & Parks LLP

(57) ABSTRACT

Managing communications with a subscriber rendering device by identifying a message that is applicable at a target time and that is designated to be received by a subscriber rendering device, determining that there is no time between a current time and the target time during which the subscriber rendering device is able to receive the message thereby determining that the message cannot be received by the subscriber rendering device prior to the target time, and performing an action responsive to determining that the message cannot be received by the subscriber rendering device prior to the target time. Related methods and apparatus are also included.

17 Claims, 4 Drawing Sheets

(51) Int. Cl.
*H04N 21/6334* (2011.01)
*H04L 12/12* (2006.01)
*H04N 21/414* (2011.01)
*H04N 21/488* (2011.01)
*H04L 12/58* (2006.01)

(56) References Cited

U.S. PATENT DOCUMENTS

| | | |
|---|---|---|
| 2005/0120197 A1 | 6/2005 | Bons et al. |
| 2007/0076728 A1 | 4/2007 | Rieger et al. |
| 2007/0261076 A1 | 11/2007 | Puputti |
| 2009/0187948 A1 | 7/2009 | Malik |
| 2009/0190757 A1 | 7/2009 | Chen et al. |
| 2010/0009725 A1 | 1/2010 | Banerjea |
| 2010/0141848 A1 | 6/2010 | Bastable et al. |
| 2011/0044227 A1 | 2/2011 | Harrang et al. |

FOREIGN PATENT DOCUMENTS

| | | |
|---|---|---|
| WO | WO 2006/043766 A1 | 4/2006 |
| WO | WO 2008/082234 A1 | 7/2008 |

OTHER PUBLICATIONS

Sep. 21, 2011 Office Communication in connection with prosecution of GB 1109624.5.

May 16, 2012 2012 Office Communication in connection with prosecution of GB 1200769.6.

Bart Kirkels et al., "A Security Architecture for Pay-Per-View Business Models in Conditional Access Systems," *DRM '07* (Oct. 29, 2007).



MESSAGE DELIVERY HANDLING

RELATED APPLICATION INFORMATION

The present application is a 35 USC §371 application of PCT/IB2011/055359, filed on 29 Nov. 2011 and entitled "Message Delivery Handling", which was published on 13 Dec. 2012 in the English language with International Publication Number WO 2012/168769 and which relies for priority on UK Patent Application 1109624.5 filed 9 Jun. 2011.

FIELD OF THE INVENTION

The invention relates to subscription-based television systems in general.

BACKGROUND OF THE INVENTION

In a typical subscription-based television system, programming content is transmitted from a "headend" facility, such as via satellite, cable, or other communications medium, and is received at a subscriber's premises via a set-top box (STB) that processes the transmission signal for display, such as on a television screen or other display device, and/or for recording, such as on a personal video recorder (PVR). In addition to programming content, headends often transmit messages to STBs, such as Entitlement Management Messages (EMMs) that enable STBs to control subscriber access to programming content. Such messages are often time-sensitive, such as where an EMM relates to the broadcast of a live sporting event that takes place during a specific time period, and thus headends will typically attempt to deliver time-sensitive messages in advance of their relevant time periods. Unfortunately, an STB that is powered down or that is in a stand-by mode when an attempt is made to deliver a time-sensitive message to the STB, might not receive the message in time.

SUMMARY OF THE INVENTION

There is provided in accordance with an embodiment of the present invention a method for managing communications with a subscriber rendering device, the method including identifying a message that is applicable at a target time and that is designated to be received by a subscriber rendering device, determining that there is no time between a current time and the target time during which the subscriber rendering device is able to receive the message thereby determining that the message cannot be received by the subscriber rendering device prior to the target time, and performing an action responsive to determining that the message cannot be received by the subscriber rendering device prior to the target time.

Still further in accordance with an embodiment of the present invention the determining step includes determining that the subscriber rendering device is scheduled to be in a stand-by mode of operation continuously between a current time and the target time.

Additionally in accordance with an embodiment of the present invention the method further includes receiving from the subscriber rendering device a notification indicating that the subscriber rendering device is entering a stand-by mode of operation, where the notification indicates an expected wake-up time when the subscriber rendering device is expected to leave the stand-by mode of operation.

Moreover in accordance with an embodiment of the present invention the performing step includes sending a notification to a mobile communications device of the subscriber indicating that the message cannot be received by the subscriber rendering device prior to the target time.

Still further in accordance with an embodiment of the present invention the method further includes performing the identifying, determining, and performing steps at a headend.

Additionally in accordance with an embodiment of the present invention the identifying step includes receiving another message from the subscriber, where the other message is sent from a device other than the subscriber rendering device.

Moreover in accordance with an embodiment of the present invention the method further includes receiving from the subscriber rendering device a notification indicating that the subscriber rendering device has left a stand-by mode of operation prior to the target time, and transmitting the message to the subscriber rendering device for receipt by the subscriber rendering device prior to the target time.

Further in accordance with an embodiment of the present invention the message is for use by the subscriber rendering device.

Still further in accordance with an embodiment of the present invention the message relates to the scheduling of a recording that is to be effected by the subscriber rendering device.

Additionally in accordance with an embodiment of the present invention the message is an entitlement management message.

There is also provided in accordance with an embodiment of the present invention a method for managing communications with multiple subscriber rendering devices, the method including identifying a plurality of messages designated to be received by a plurality of subscriber rendering devices prior to a target time and that were not received by the plurality of subscriber rendering devices prior to the target time, and calculating a transmission capacity required to deliver the plurality of messages to the plurality of subscriber rendering devices during a post-target-time period during which the plurality of subscriber rendering devices are expected to request the messages, where the transmission capacity is calculated in accordance with a known capacity to transmit messages per unit time.

Further in accordance with an embodiment of the present invention the method further includes determining at least one frequency that the subscriber rendering devices are expected to be tuned to during the post-target-time period, and scheduling delivery of any of the messages at the at least one frequency.

Still further in accordance with an embodiment of the present invention the method further includes determining at least one frequency that the subscriber rendering devices are expected to be tuned to during the post-target-time period, and calculating the transmission capacity to deliver the plurality of messages at the at least one frequency.

There is also provided in accordance with an embodiment of the present invention a system for managing communications with a subscriber rendering device, the system including a message picker configured to identify a message that is applicable at a target time and that is designated to be received by a subscriber rendering device, a message dispatcher configured to determine that there is no time between a current time and the target time during which the subscriber rendering device is able to receive the message to thereby determine that the message cannot be received by the subscriber rendering device prior to the target time, and a contingency manager configured to perform an action responsive to determining that the message cannot be received by the subscriber rendering device prior to the target time.

Still further in accordance with an embodiment of the present invention the message dispatcher is configured to determine that the subscriber rendering device is scheduled to be in a stand-by mode of operation continuously between a current time and the target time.

Additionally in accordance with an embodiment of the present invention the system further includes a status manager configured to receive from the subscriber rendering device a notification indicating that the subscriber rendering device is entering a stand-by mode of operation, where the notification indicates an expected wake-up time when the subscriber rendering device is expected to leave the stand-by mode of operation.

Moreover in accordance with an embodiment of the present invention the contingency manager is configured to send a notification to a mobile communications device of the subscriber indicating that the message cannot be received by the subscriber rendering device prior to the target time.

Still further in accordance with an embodiment of the present invention the message picker, message dispatcher, and contingency manager are implemented at a headend.

Additionally in accordance with an embodiment of the present invention the message dispatcher is configured to transmitting the message to the subscriber rendering device for receipt by the subscriber rendering device prior to the target time responsive to the receipt of a notification from the subscriber rendering device indicating that the subscriber rendering device has left a stand-by mode of operation prior to the target time.

Moreover in accordance with an embodiment of the present invention the message is for use by the subscriber rendering device.

Further in accordance with an embodiment of the present invention the message relates to the scheduling of a recording that is to be effected by the subscriber rendering device.

Still further in accordance with an embodiment of the present invention the message is an entitlement management message.

There is also provided in accordance with an embodiment of the present invention a system for managing communications with multiple subscriber rendering devices, the system including a message picker configured to identify a plurality of messages designated to be received by a plurality of subscriber rendering devices prior to a target time and that were not received by the plurality of subscriber rendering devices prior to the target time, and a capacity calculator configured to calculate a transmission capacity required to deliver the plurality of messages to the plurality of subscriber rendering devices during a post-target-time period during which the plurality of subscriber rendering devices are expected to request the messages, where the transmission capacity is calculated in accordance with a known capacity to transmit messages per unit time.

Further in accordance with an embodiment of the present invention the message picker is configured to determine at least one frequency that the subscriber rendering devices are expected to be tuned to during the post-target-time period, and schedule delivery of any of the messages at the at least one frequency.

Still further in accordance with an embodiment of the present invention the message picker is configured to determine at least one frequency that the subscriber rendering devices are expected to be tuned to during the post-target-time period, and where the capacity calculator is configured to calculate the transmission capacity to deliver the plurality of messages at the at least one frequency.

BRIEF DESCRIPTION OF THE DRAWINGS

The invention will be understood and appreciated more fully from the following detailed description taken in conjunction with the appended drawings in which.

DETAILED DESCRIPTION OF AN EMBODIMENT

Figure 1:
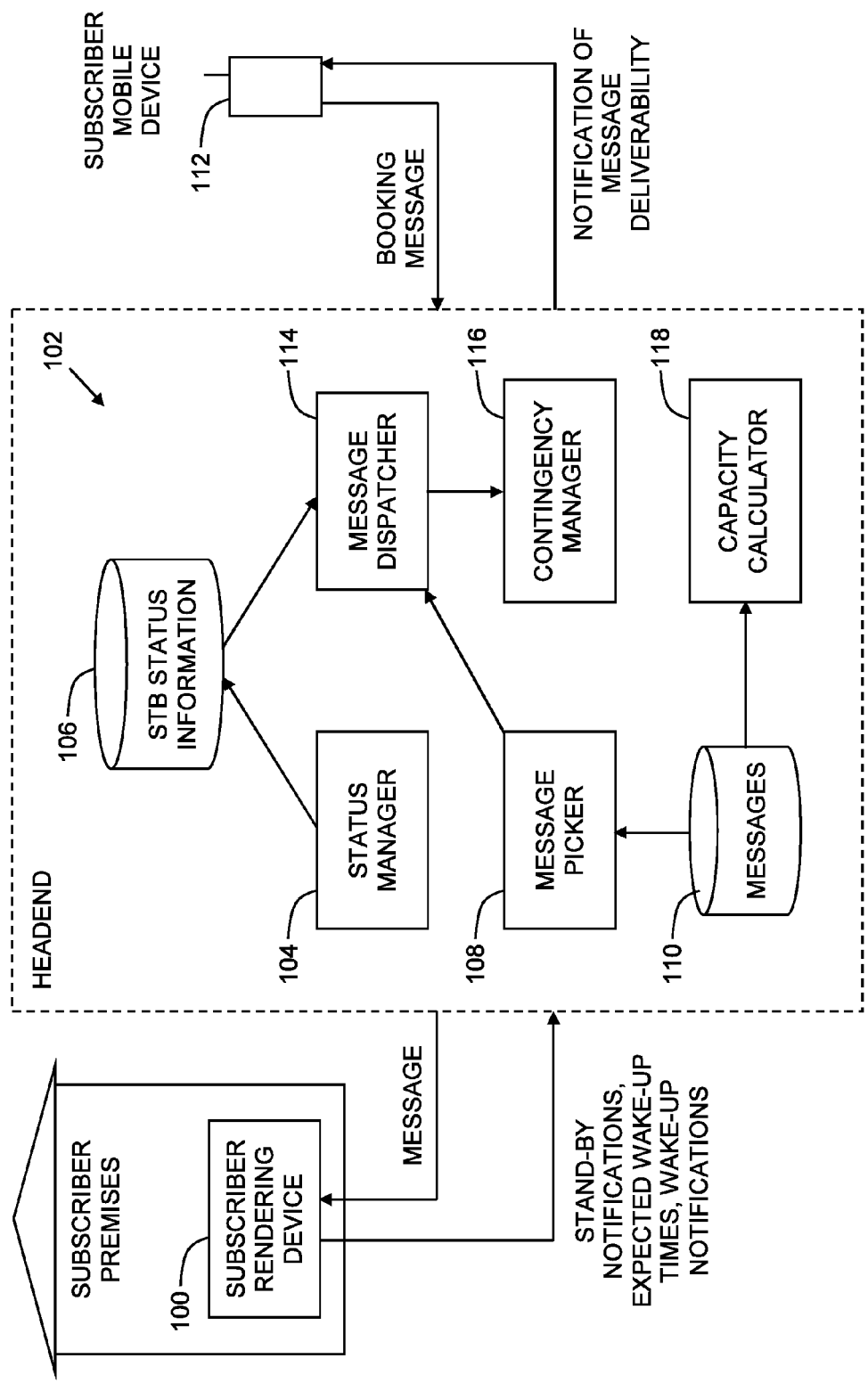
FIG. 1 is a simplified conceptual illustration of a system for message delivery in a subscription-based television system, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block Of blocks.

Reference is now made to FIG. 1, which is a simplified conceptual illustration of a system for message delivery in a subscription-based television system, constructed and operative in accordance with an embodiment of the invention. In the system of FIG. 1, a subscriber rendering device 100 is shown, which may be a set top box (STB), a mobile rendering device, or any suitably configured device for receiving subscription-based television services. For the sake of simplicity, only one subscriber rendering device 100 is shown installed at the premises of one subscriber of a subscription-based television system, although the invention is equally applicable for any number of subscriber rendering devices at any number of locations. Subscriber rendering device 100 typically includes standard hardware components and software components as is known in the art for use in a subscription-based television system. Subscriber rendering device 100 may also function as a personal video recorder (PVR), also known in the art as a digital video recorder (DVR), and/or operate, in accordance with conventional techniques, in conjunction with a PVR (not shown) that is separate from subscriber rendering device 100.

Subscriber rendering device 100 typically receives content, such as television programming and radio broadcasts, as well as messages, such as Entitlement Management Messages (EMMs), from a headend, generally designated by reference numeral 102, in accordance with conventional techniques. Headend 102 typically includes standard hardware components and software components as is known in the art.

Beyond their known configurations in the art, subscriber rendering device 100 and headend 102 are typically configured to operate as described hereinbelow.

Subscriber rendering device 100 is typically configured to notify headend 102 regarding the entry of subscriber rendering device 100 into a stand-by mode of operation, where subscriber rendering device 100 sends such notifications to headend 102 at the time subscriber rendering device 100 enters stand-by mode and/or in advance of future stand-by times scheduled for subscriber rendering device 100. Subscriber rendering device 100 is also typically configured to indicate to headend 102, in the same or separate notifications, one or more expected wake-up time when subscriber rendering device 100 is expected to leave a stand-by mode. Subscriber rendering device 100 is also typically configured to notify headend 102 upon leaving a stand-by mode at a time other than an expected wake-up time. Additionally or alternatively, headend 102 may be configured to determine when subscriber rendering device 100 will be awake based on heuristics. For example, headend 102 may know what algorithm subscriber rendering device 100 uses to determine when it is to communicate with headend 102 or another source, such as to check for Electronic Program Guide (EPG) updates or software updates periodically and/or at particular times, and may therefore know when subscriber rendering device 100 must be awake in order to perform such tasks.

Headend 102 typically includes a status manager 104 that maintains, such as in a status information data store 106, information regarding when subscriber rendering device 100 is or will be in a stand-by mode of operation, as well as one or more wake-up times, such as where this information is learned from notifications received from subscriber rendering device 100 as described hereinabove.

Headend 102 also typically includes a message picker 108 that is configured to identify a message, such as may be held in a messages data store 110, that is applicable at a target time and that is designated to be received by subscriber rendering device 100. The message may, for example, correspond to a communication, such as a "booking" request, sent previously to headend 102 by a subscriber associated with subscriber rendering device 100, such as from a mobile communications device 112, instructing subscriber rendering device 100 to record a particular television program broadcast, where the target time is the time at which the broadcast is scheduled to begin. Headend 102 may create the message based on the booking request, or the message may be the booking request itself, where headend 102 forwards the booking request to subscriber rendering device 100. Alternatively, the message may, for example, be an EMM message entitling the subscriber to view the broadcast.

Headend 102 also typically includes a message dispatcher 114 that is configured to determine whether or not a message that is identified by message picker 108 as being designated to be received by subscriber rendering device 100 can be received by subscriber rendering device 100 prior to the target time at which the message is applicable. For example, message dispatcher 114 may determine that there is no time between the current time and the target time during which subscriber rendering device 100 is able to receive the message. This determination may, for example, be based on information in data store 106 indicating that subscriber rendering device 100 is currently in a stand-by mode of operation and will remain in stand-by mode continuously through the target time.

Headend 102 also typically includes a contingency manager 116 that is configured to perform a contingency action if message dispatcher 114 determines that a message that is designated to be received by subscriber rendering device 100 cannot be received by subscriber rendering device 100 prior to the target time at which the message is applicable. The contingency action may, for example, include sending a notification, such as an SMS message to mobile communications device 112 of the subscriber associated with subscriber rendering device 100, indicating that the message cannot be received by subscriber rendering device 100 prior to the target time. Conversely, if message dispatcher 114 determines that the message can be received by subscriber rendering device 100 prior to the target time, contingency manager 116 may send a notification so indicating, such as an SMS message to mobile communications device 112 of the subscriber associated with subscriber rendering device 100.

If, after message dispatcher 114 determines that a message that is designated to be received by subscriber rendering device 100 cannot be received by subscriber rendering device 100 prior to the target time at which the message is applicable, headend 102 receives a notification from subscriber rendering device 100 indicating that subscriber rendering device 100 has left a stand-by mode of operation prior to the target time, message dispatcher 114 is typically configured to transmit the message to subscriber rendering device 100 for receipt by subscriber rendering device 100 prior to the target time. When this occurs, contingency manager 116 may send a notification, such as an SMS message to mobile communications device 112 of the subscriber associated with subscriber rendering device 100, indicating that the message can now be received by subscriber rendering device 100 prior to the target time.

Headend 102 also typically includes a capacity calculator 118 that is configured to determine the transmission capacity required to deliver multiple messages to multiple subscriber rendering devices during a time period during which the subscriber rendering devices are expected to request the messages. For example, multiple EMMs may be designated to be received by multiple subscriber rendering devices prior to a target time, such as where the EMMs are for a major sporting event broadcast and are designated to be received by subscribers one week prior to the start of the broadcast. However, where multiple EMMs were not received at their designated subscriber rendering devices prior to the target time, such as due to reasons described hereinabove, these subscriber rendering devices may be expected to request the EMM messages after the target time, as when the corresponding subscribers are expected to begin watching the sporting event broadcast during a post-target-time period after the broadcast has already begun, such as during the first half hour of the broadcast. In order to determine the transmission capacity required to deliver the messages to their designated subscriber rendering devices during the post-target-time period, capacity calculator 118 is configured to determine, typically prior to the target time, the required transmission capacity, typically by calculating the transmission capacity in accordance with a known capacity of headend 102 to transmit messages per unit time. The calculated transmission capacity required to transmit the messages may be used by the operator of headend 102 to determine whether headend 102 currently has sufficient transmission capacity to transmit the messages in the time required, or whether the transmission capacity of headend 102 should be adjusted to provided the calculated transmission capacity.

Typically, a subscriber rendering device such as subscriber rendering device 100 above is tuned to a specific frequency, or a small set of specific frequencies. This frequency or set of frequencies may change when the subscriber rendering device changes between, for instance, TV channels. When scheduling a message for delivery to a subscriber rendering device, headend 102 is typically configured to determine which frequencies the subscriber rendering device will be tuned to during the expected delivery period. Delivery may then be scheduled for that specific frequency, or set of frequencies.

Figure 2:
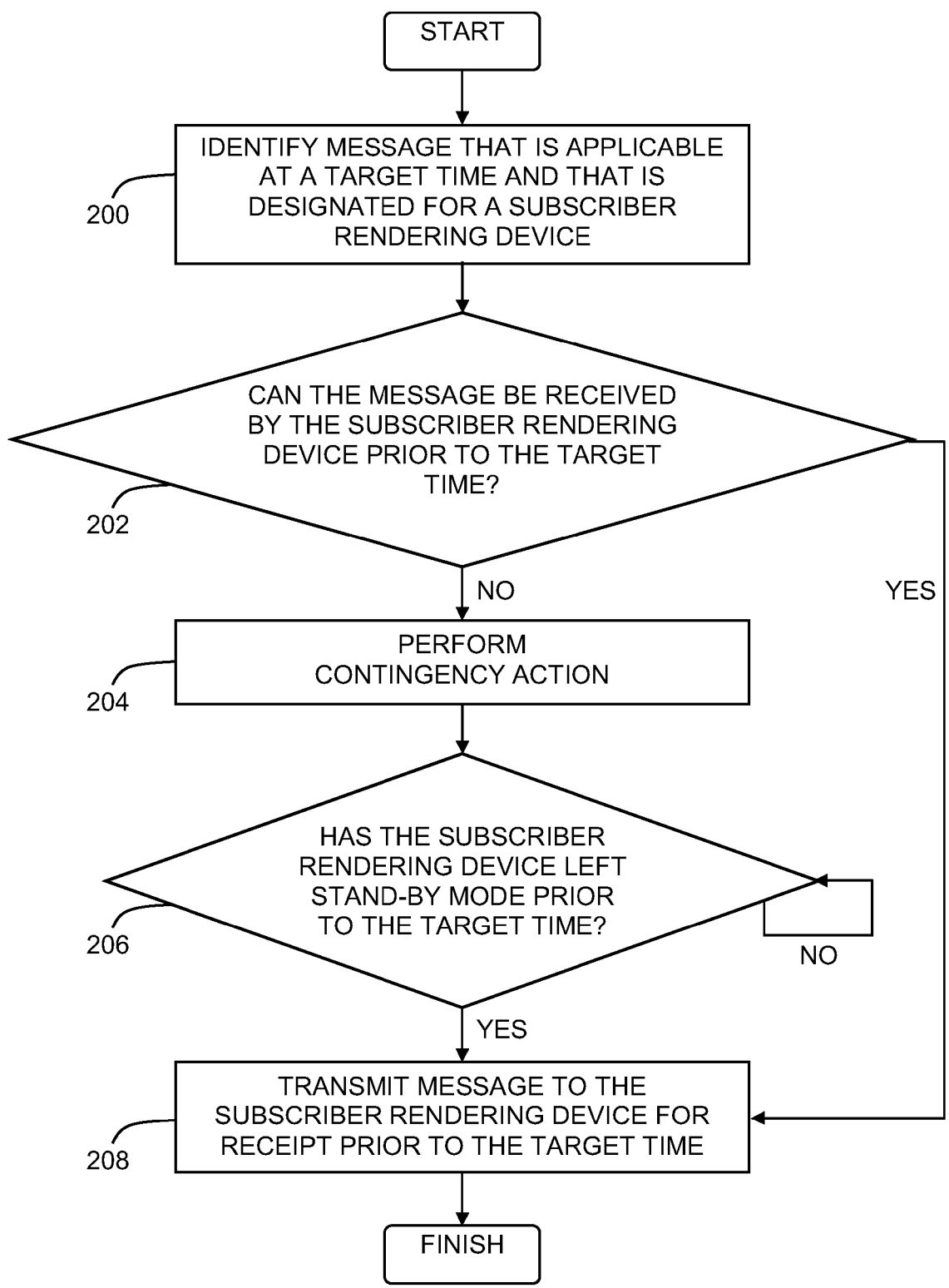
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 a message is identified that is applicable at a target time and that is designated to be received by a subscriber rendering device, such as at a subscriber's premises (step 200), including where the message may correspond to a message that was sent previously by the subscriber from a mobile communications device. If it is determined that the message cannot be received by the subscriber rendering device prior to the target time (step 206), such as where there is no time between the current time and the target time during which the subscriber rendering device is able to receive the message due to the subscriber rendering device being in a stand-by mode of operation from the current time through the target time, a contingency action is performed (step 204), such as sending a notification to the subscriber indicating that the message cannot be received by the subscriber rendering device prior to the target time. If a notification is subsequently received from the subscriber rendering device indicating that the subscriber rendering device has left a stand-by mode of operation prior to the target time (step 206), the message is transmitted to the subscriber rendering device for receipt by the subscriber rendering device prior to the target time (step 208).

Figure 3:
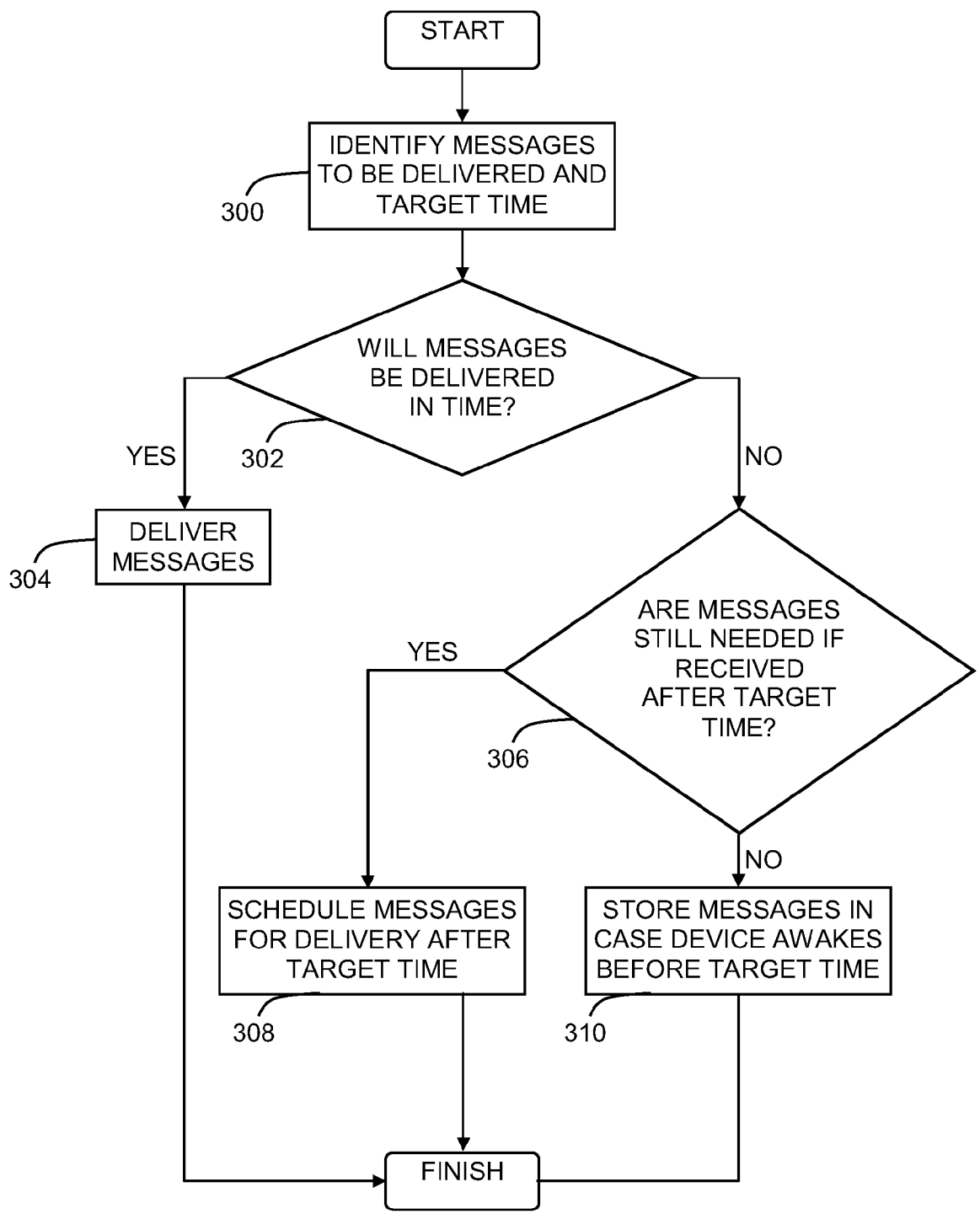
FIG. 3 is a simplified flowchart illustration of an exemplary method of operation of the system of FIG. 1, operative in accordance with another embodiment of the invention.

Reference is now made to FIG. 3, which is a simplified flowchart illustration of an exemplary method of operation of the system of FIG. 1, operative in accordance with an another embodiment of the invention. In the method of FIG. 3, one or more messages are identified that are to be delivered to a subscriber rendering device, as are their target time(s) (step 300). If the messages will be delivered before the target time (step 302), such as where it is determined that the subscriber rendering device will be able to receive the messages, the messages are delivered (step 304). If the messages will not be delivered before the target time, such as where it is determined that the subscriber rendering device will be in stand-by mode or otherwise unable to receive the messages, if the messages are still needed if they are received after the target time (step 306), such as where the message is an EMM that would enable a subscriber to begin watching a sporting event broadcast that has already begun, then the messages are scheduled for delivery after the target time (step 308). If the messages will not be delivered before the target time, and the messages are not needed if they are received after the target time, then the messages are stored for delivery in the event the subscriber rendering device becomes able to receive the messages before the target time (step 310).

Figure 4:
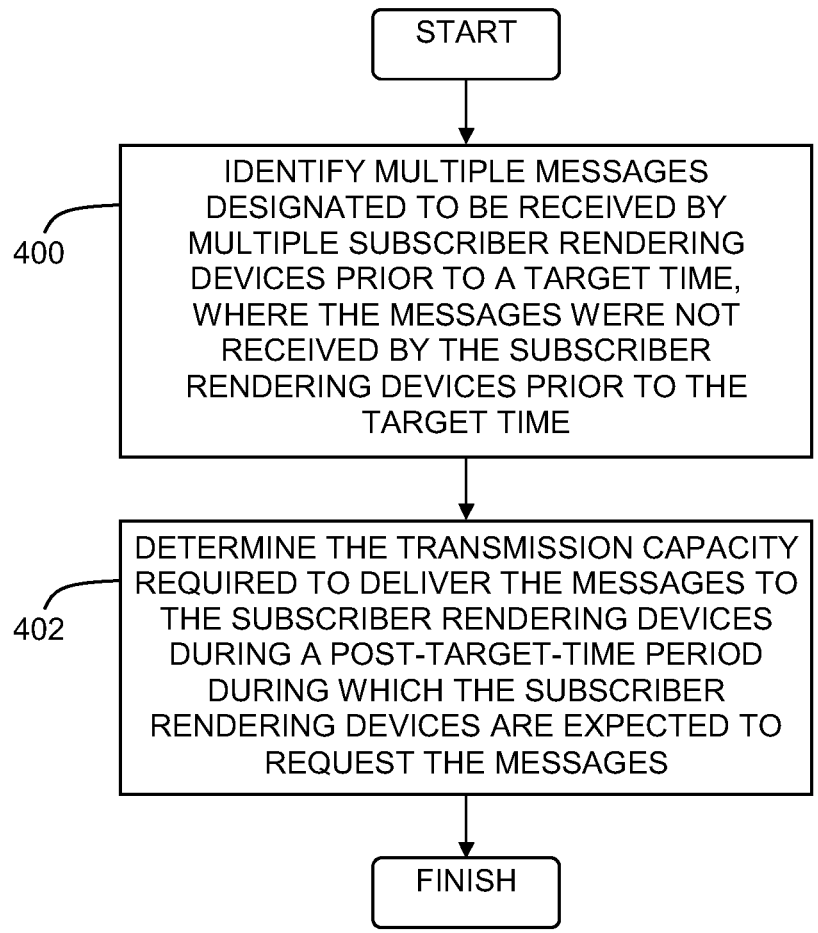
FIG. 4 is a simplified flowchart illustration of an exemplary method of operation of the system of FIG. 1, operative in accordance with another embodiment of the invention.

Reference is now made to FIG. 4, which is a simplified flowchart illustration of an exemplary method of operation of the system of FIG. 1, operative in accordance with an another embodiment of the invention. In the method of FIG. 4, multiple messages are identified, where the messages are designated to be received by multiple subscriber rendering devices prior to a target time and where the messages were not received by the subscriber rendering devices prior to the target time (step 400). A calculation is made to determine the transmission capacity required to deliver the messages to the subscriber rendering devices during a post-target-time period during which the subscriber rendering devices are expected to request the messages (step 402), such as where the transmission capacity is calculated in accordance with a known capacity to transmit messages per unit time. If the specific frequencies the subscriber rendering devices will be tuned to during the post-target-time period can be determined, the transmission capacity may be calculated with regard to delivering messages over the specific frequencies.

The flowchart and block diagrams in the drawing figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the drawing figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for managing communications with a subscriber rendering device, the method comprising:
   identifying a message that is applicable at a target time and that is designated to be received by a subscriber rendering device;
   receiving from the subscriber rendering device a notification indicating that the subscriber rendering device is entering a stand-by mode of operation, where the notification indicates an expected wake-up time when the subscriber rendering device is expected to leave the stand-by mode of operation;
   determining that there is no time between a current time and the target time during which the subscriber rendering device is able to receive the message thereby determining that the message cannot be received by the subscriber rendering device prior to the target time; and
   performing an action responsive to determining that the message cannot be received by the subscriber rendering device prior to the target time.

2. The method according to claim 1 where the determining step comprises determining that the subscriber rendering device is scheduled to be in a stand-by mode of operation continuously between a current time and the target time.

3. The method according to claim 1 where the performing step comprises sending a notification to a mobile communication device of the subscriber indicating that the message cannot be received by the subscriber rendering device prior to the target time.

4. The method according to claim 1 and further comprising performing the identifying, determining, and performing steps at a headend.

5. The method according to claim 1 where the identifying step comprises receiving another message from the subscriber, where the other message is sent from a device other than the subscriber rendering device.

6. The method according to claim 1 and further comprising:
   receiving from the subscriber rendering device a notification indicating that the subscriber rendering device has left a stand-by mode of operation prior to the target time; and
   transmitting the message to the subscriber rendering device for receipt by the subscriber rendering device prior to the target time.

7. The method according to claim 1 where the message is for use by the subscriber rendering device.

8. The method according to claim 1 where the message relates to the scheduling of a recording that is to be effected by the subscriber rendering device.

9. The method according to claim 1 where the message is an entitlement management message.

10. A system for managing communications with a subscriber rendering device, the system comprising:
    a message picker configured to identify a message that is applicable at a target time and that is designated to be received by a subscriber rendering device;
    a status manager configured to receive from the subscriber rendering device a notification indicating that the subscriber rendering device is entering a stand-by mode of operation, wherein the notification indicates an expected wake-up time when the subscriber rendering device is expected to leave the stand-by mode of operation;

a message dispatcher configured to determine that there is no time between a current time and the target time during which the subscriber rendering device is able to receive the message to thereby determine that the message cannot be received by the subscriber rendering device prior to the target time; and a contingency manager configured to perform a action responsive to determining that the message cannot be received by the subscriber rendering device prior to the target time.

11. The system according to claim 10 where the message dispatcher is configured to determine that the subscriber rendering device is scheduled to be in a stand-by mode of operation continuously between a current time and the target time.

12. The system according to claim 10 where the contingency manager is configured to send a notification to a mobile communication device of the subscriber indicating that the message cannot be received by the subscriber rendering device prior to the target time.

13. The system according to claim 10 where the message picker, message dispatcher, and contingency manager are implemented at a headend.

14. The system according to claim 10 where the message dispatcher is configured to transmitting the message to the subscriber rendering device for receipt by the subscriber rendering device prior to the target time responsive to the receipt of a notification from the subscriber rendering device indicating that the subscriber rendering device has left a stand-by mode of operation prior to the target time.

15. The system according to claim 10 where the message is for use by the subscriber rendering device.

16. The system according to claim 10 where the message relates to the scheduling of a recording that is to be effected by the subscriber rendering device.

17. The system according to claim 10 where the message is an entitlement management message.

\* \* \* \* \*